(12) United States Patent
Karl et al.

(10) Patent No.: US 7,983,653 B2
(45) Date of Patent: *Jul. 19, 2011

(54) ALERT SYSTEM AND PERSONAL APPARATUS

(75) Inventors: Maurice W. Karl, Columbia, MO (US); Joshua A. Bryan, Columbia, MO (US)

(73) Assignee: Maurice W. Karl, Columbia, MO (US)

(*) Notice: Subject to any disclaimer, the term of this patent is extended or adjusted under 35 U.S.C. 154(b) by 80 days.

This patent is subject to a terminal disclaimer.

(21) Appl. No.: 12/568,394

(22) Filed: Sep. 28, 2009

(65) Prior Publication Data
US 2010/0015943 A1  Jan. 21, 2010

Related U.S. Application Data

(63) Continuation of application No. 11/203,721, filed on Aug. 15, 2005, now Pat. No. 7,616,942.

(60) Provisional application No. 60/603,697, filed on Aug. 23, 2004.

(51) Int. Cl.
*H04M 11/04* (2006.01)
*H04N 7/10* (2006.01)
(52) U.S. Cl. ...................... 455/404.1; 725/33
(58) Field of Classification Search ............... 455/404.1
See application file for complete search history.

(56) References Cited

U.S. PATENT DOCUMENTS

| | | | |
|---|---|---|---|
| 5,838,237 A * | 11/1998 | Revell et al. ............... 340/573.1 |
| 6,002,748 A | 12/1999 | Leichner | |
| 6,028,514 A | 2/2000 | Lemelson et al. | |
| 6,169,476 B1 | 1/2001 | Flanagan | |
| 6,463,462 B1 | 10/2002 | Smith et al. | |
| 6,493,633 B2 | 12/2002 | Baron, Sr. et al. | |
| 6,594,345 B1 | 7/2003 | Vinson | |
| 6,867,688 B2 | 3/2005 | Lamb | |
| 2002/0184346 A1 | 12/2002 | Mani | |
| 2003/0076932 A1 | 4/2003 | Andrew | |
| 2004/0103158 A1 | 5/2004 | Vella et al. | |
| 2004/0203568 A1 | 10/2004 | Kirtland | |

\* cited by examiner

*Primary Examiner* — Patrick N Edouard
*Assistant Examiner* — Huy C Ho
(74) *Attorney, Agent, or Firm* — Erickson Kernell Derusseau & Kleypas, LLC

(57) ABSTRACT

An alert system and apparatus for an emergency alert system is provided to disseminate emergency information to the public utilizing a universal paging system through a personal alert device such as a cellular telephone, pager, PDA or E-FOB. The alert system utilizes an emergency alert system signal from the NOAA alert system to broadcast the alert message to cellular devices in a specified alert area. The broadcast message provides information related to the alert level. The E-FOB may be a passive device which is activated by a NOAA alert signal and then listens for a cellular message. If the E-FOB is within the alert area, the E-FOB provides information to the user. If the E-FOB is not within the alert area, the E-FOB returns to a passive state.

21 Claims, 2 Drawing Sheets

ALERT SYSTEM AND PERSONAL APPARATUS

CROSS-REFERENCE TO RELATED APPLICATIONS

This application is a continuation application of Ser. No. 11/203,721, filed Aug. 15, 2005 now U.S. Pat. No. 7,616,942, entitled ALERT SYSTEM AND PERSONAL APPARATUS, which claims the benefit of Ser. No. 60/603,697, filed Aug. 23, 2004 entitled EMERGENCY ALERT RESPONSE SYSTEM.

FIELD OF THE INVENTION

The present invention relates to an alert system and apparatus for an emergency alert system, and in particular, to an alert system and apparatus to disseminate emergency information to the public utilizing a universal paging system through a personal alert device.

BACKGROUND OF THE INVENTION

The Federal Communication Commission (FCC) proposed in the mid-1990's the establishment of the Emergency Alert System (EAS) as a replacement for the aging Emergency Broadcast System (EBS). The creation of the EAS has allowed for and continues to improve the dissemination of information vital to ensuring the safety of the public in the event of severe weather, catastrophic event and/or terrorist attacks. The EAS system has adopted a mandatory standard digital protocol that will be used by all broadcast station licensees, including noncommercial educational class D FM stations and low power TV stations. The creation of this universal digital protocol would now make it possible to develop universal paging systems for any part of the country served by the EAS network. The Purple Tree Technologies proposed system would consist of a methodology for acquiring the EAS signal from originator of the message such as Emergency Action Notification Network (EAN), Primary Entry Point System (PEP), the National Weather Service (WXR), the civil authorities (CIV), or a broadcast station or cable system (EAS), developed to activate the cell towers and/or satellites in the area affected by the event, and the device designed with today's technology to be similar in size of a key chain remote for keyless entry system used in automobiles around the world.

Emergency Alert System consists of a network of encoders and decoders located at all broadcast stations nation wide for the purpose of notifying the public of national emergencies. This system is also being used by state and local emergency management personnel for warning the public of pending severe weather, tornados, radioactive release, Amber alerts, etc. The FCC has adopted a mandatory protocol for the transmission of signals which includes state and local identification and emergency codes. This universal approach greatly enhances our ability to adopt a national approach in creating a personal portable emergency alert system. The Federal Communication Commission released the details, including location and emergency codes, of the proposed Emergency Alert System in document FCC 94-288.

Once an EAS signal has been encoded and transmitted, the National Oceanic and Atmospheric Administration (NOAA) will have access to the information that not only includes weather-related events but also other catastrophic events, Amber alerts and/or terrorist attacks, for example. The ability to access NOAA's database with regards to the EAS transmitted code would allow for the identification of the location of the warning area and the type of emergency just as hundreds of broadcast stations are notified hundreds of times a year—without the cost of tapping into EAS units throughout the country. Federal, state, or local governmental agencies requiring the ability to transmit emergency broadcast to populace would have same capability with similar set-up.

When mobile phones were first developed, their purpose was simply to allow for voice communications. Most of these systems used analog technologies that transmitted voice over a finite number of FM radio bands. These systems are all but non-existent today and are known as first generation (1G) cellular networks. The second generation (2G) networks began to emerge in the 80's as digital networks. These continued to focus on voice communication, but added some extended features such as basic text or email messaging, caller id, multi-way calling, extended roaming, and the ability to handle more users.

There were two competing underlying technologies for 2G networks developed that are worth mentioning. The first of these is time division multiple access (TDMA). This approach to sending digital signals through the air divides the allocated cell bandwidth (there are two major bands allocated by the FCC to cell phones: 824-894 Mhz and 1850-1990 Mhz) into a series of narrow bands. These narrow bands are then divided into multiple time slices. Each time slice with in a band constitutes a communication, channel with a given mobile device. The major networking technologies that use this method are GSM and IS-136. Though there are many other TDMA networking standards, these are the only two with any significant land coverage.

The other 2G technology developed is code division multiple access (CDMA). This technology allows transmission of data over the entire allotted cellular phone spectrum. The messages for a specific mobile device will be coded with a unique signature that the device can recognize and interpolate from the broadband data stream. This technology is similar to a large party where everyone is speaking at once, but one can differentiate conversation either by voice or by language. Because the entire spectrum is used, and individual bands or time slices do not need to be allocated, higher data rates can be achieved. Also, an additional advantage is the "soft" user limit. There is not a finite number of channels available for subscribers, instead, as the number of users on a given cell increases, the available bandwidth per user decreases. The result is added noise or slower connections as traffic increases rather than denial of service. The primary 2G networking standard adopted on CDMA is commonly referred to as cdmaOne. This includes the IS-95-A and IS-95-B standards.

Recently, the rapid expansion of the Internet and increased demand for mobile data services has led to the development of third generation (3G) networks. The primary impetus for 3G networks is to allow for internet protocol (IP) connection and functionality for mobile devices. These networking standards are extremely complex and any functional description of them is beyond the scope of this paper. However, they have many features that are very relevant to the development of an emergency broadcast system. Because of the high data rates required by most IP based services CDMA is the radio interface of choice for 3G networks. The most common networking protocols that fall in this category are CDMA2000-1x and WCDMA, also known as UMTS. UMTS is considered to be the ultimate goal for 3G technology.

There is another protocol worth mentioning that does not fall directly into either 2G or 3G category. GPRS is an addendum to the GSM networking standard that implements an "always on" IP connection to the internet. Because this is not a fully realized 3G standard, but goes beyond standard 2G services, GPRS is often referred to as being 2.5G. GPRS is currently implemented in most GSM networks world wide. Also, more recently EDGE technology has been developed as an enhancement to GPRS services, though it is not as widely implemented.

Today, most cellular network providers are in a long process of upgrading from 2G networks to 3G networks. AT&T® and Cingular®, two of the largest owners of IS-136 networks are on a migration path to GSM networking technology and then eventually to UMTS. Though UMTS realization on these networks probably will not for several years, they have already deployed GSM/GPRS networks across most major population centers in the U.S. Other companies, such as Verizon®, currently have functioning cdmaOne networks covering most of the U.S. land area and are in the process of upgrading to CDMA2000-1x and eventually to UMTS. Other cellular companies are at different stages in development but still evolving towards UMTS.

In order to broadcast from a cellular network to all devices in the cell, the format of the data must be such that it does not disrupt other communications over the network. This means that any technology chosen must already be designed for cell broadcast functions. The networking technologies that are designed to do this kind of broadcasting are the 2.5G and 3G networks. The specific technologies that support cell broadcasting are GPS GPRS/EDGE, CDMA2000-1x and UMTS. GPS networks implement the cell broadcasts through GPRS/EDGE service enhancements. These enhancements allow short, unacknowledged, text messages to be transmitted to all or a group of mobile devices within a cell. The mobile devices may be configured to receive all broadcasts or just specific kinds of broadcasts depending on the user's preferences. UMTS networks also support the GPRS/EDGE broadcast controls in addition to other more powerful native broadcast controls. Some of the more powerful controls allow for broadcast audio, images, and even video. Though CDMA2000-1x networks are not natively capable of broadcast messages, discussion of implementing the GPRS text broadcasting controls on these networks has reached public forums in late 2003 and early 2004. The date of implementation for these services is not clear.

There are three factors to consider when choosing a networking standard for the inexpensive alert receivers. One is the coverage area of existing networks. Currently GSM/GPRS covers most population centers in the U.S. CDMA2000-1x is rapidly expanding and may soon cover more area than GSM. UMTS technology is not as widely available in the U.S. The second consideration is reliability of the technology. GSM/GPRS has been time tested in Europe and other parts of the world for over a decade. The CDMA based networks are all relatively young. The third consideration is cost. This must also take into account maintenance costs. GSM technology, because of its world wide use, is probably the cheapest to implement. However, CDMA technologies, especially UMTS, are likely to be supported for the longest time and would not need to be replaced as soon.

SUMMARY OF THE INVENTION

The present invention includes a passive alert receiver which receives alert information broadcast over cellular or satellite networks. The alert receiver may include a display to display text messages related to the alert message received and colored LEDs to provide additional information such as the alert level. The alert receiver listens for a broadcast and only activates when a message is received. The alert receiver may be integrated in cellular telephones, pagers, car remotes, and other portable devices such as laptop computers and portable digital assistants.

DETAILED DESCRIPTION

Figure 1:
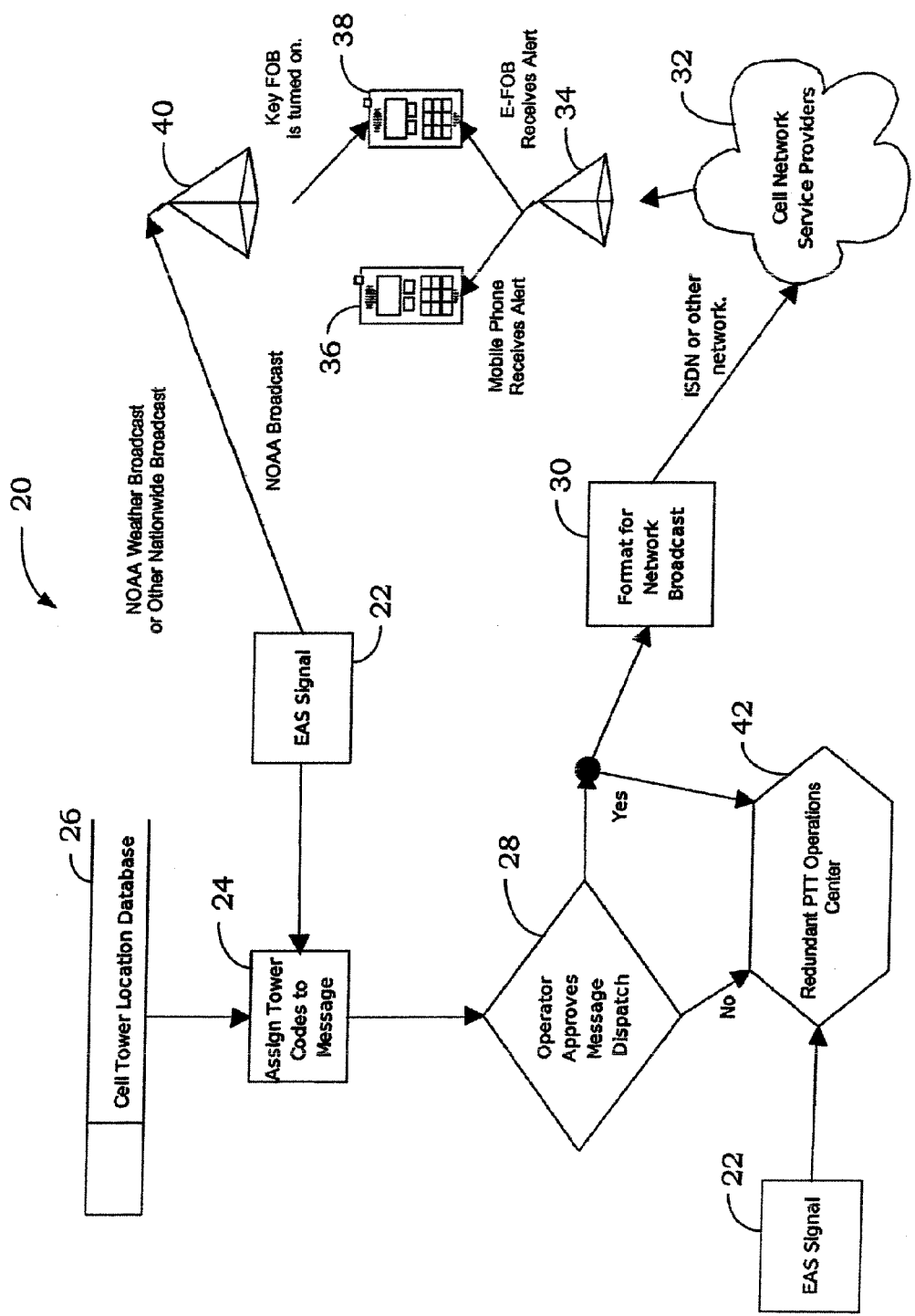
FIG. 1 is a functional block diagram of an alert system of the present invention.

Referring to FIG. 1, a cellular/satellite technology based emergency notification system of the present invention is generally indicated by reference numeral 20. The emergency notification system 20 provides a quick method for delivering emergency messages to a large number of mobile and static devices of different types in a localized area. The transmitting technology may communicate with most types and brands of mobile and static devices and limit the broadcast to the area of a single broadcast focus. An inexpensive alert receiver may be distributed to people who are unable to afford other appropriate mobile and static devices or who are responsible for lives, e.g., teachers, transportation authorities, and medical workers. The alert receiver may also be capable of alerting those impaired with hearing and visual factors.

An emergency alert system (EAS) signal is generated, block 22, by FEMA, NOAA, or other governmental agency set up to issue emergency alerts. The EAS uses a four part message for activation of the emergency system. The four parts include a preamble and EAS header codes, an audio attention signal, a message, and another preamble followed by EAS end of message codes.

The EAS protocol and message format are specified in the following representation: PREAMBLE ZCZC-ORG-EEE-PSSCCC+TTTT-JJJHHMM-LLLLLLLL "PREAMBLE" is a consecutive string of bits set to clear the system, set the automatic gain control (AGC) and set asynchronous decoder clocking cycles.

"ZCZC" is the identifier, sent literally as ASCII characters ZCZC to indicate the start of the ASCII code "ORG" is the Originator code and indicates the organization which initiated the activation of the EAS such as the Emergency Action Notification Network (EAN), the Primary Entry Point System (PEP), the National Weather Service (WXR), the civil authorities (CIV), or a broadcast station or cable system (EAS), for example.

"EEE" is the Event code which indicates the nature of the EAS activation. The event codes are compatible with the codes used by the National Weather Service (NWS) Weather Radio Specific Area Message Encoder (WRSAME). There are over 30 Event codes such as EAN—Emergency Action Notification (National only); TOR—Tornado Warning; HUW—Hurricane Warning; and TSW—Tsunami Warning, for example.

"PSSCCC" is the location Code and indicates the geographic area affected by the EAS alert. The location code uses the Federal Information Processing System (FIPS) number as described by the U.S. Department of Commerce in National Institute of Standards and Technology publication 772. "P" defines the county subdivision from 1 to 9. Within the EAS, each county of each state is divided by a grid into nine parts. "SS" indicates the state code. "CCC" indicates the county code within the state. A county code of 000 refers to the entire state.

"+TTTT" indicates the valid time period of the message in 15 minutes increments up to one hour and then in 30 minute increments beyond one hour.

"JJJHHMM" is the day in Julian Calendar days (JJJ) of the year and time in hours and minutes (HHMM) when the message was initially released by the originator using 25 hours Universal Coordinated Time (UTC).

"LLLLLLLL" is the call sign or other identification of the broadcast station, or NWS office transmitting or retransmitting the message.

When the EAS signal is received, block 24, the event code is extracted to identify the nature of the emergency and the location code is extracted to determine the specific location of the emergency. The specific location is used to query a cell tower location database 26 to identify the cellular towers located with the specified area.

The EAS coded transmission from a government agency or other authorized entity is captured and a list of local telecommunication towers in the affected area from the cell tower location database 26 is generated so that only those towers affected by the alert are activated for transmission of emergency information via a short message service, which may be a short text messaging service for pagers and cell phones. Since cellular telecommunication towers operate on the concept of line-of-site signal transmission (approximately 7 to 10 miles), the ability to activate only the pagers, cell phones and other devices in a given zone is greatly enhanced. By adopting one universal activation format signal transmitted in the 800 and 1900 MHz range, the personal emergency alert devices may be activated and receive the transmission via the cellular telecommunication tower.

Standardized icons may also be used which are easily recognizable to an individual, regardless of language and hearing barriers. Short public service announcements to educate the population to the identification and significance of each icon, representing national events, weather-related incidents, and Amber Alerts, for example, may be issued.

An operator in an appropriate data center may be prompted to approve delivery of the alert code to the cell towers identified in the region, block 28, or the alert code may be automatically dispatched. If the message is approved, the message is formatted for transmission to the cellular network providers over an Integrated Services Digital Network (ISDN) or other suitable network connection, block 30. The cellular network service providers 32 broadcast the message through their network of cell towers 34. Mobile phones 36 in the identified area receive the cell broadcast message from the network to alert the user of the nature of the emergency. The majority of cellular phones and other wireless devices in use today are capable of receiving broadcast messages through the GSM and CDMA technologies.

Cell phones and pagers 36 are designed to operate in the 800 and 1,900 MHz range and are capable of decoding a limited number of encrypted messages transmitted by the activated cell towers 34. The cell phones and pagers 36 should be designed for Coded Division Multi Access or Time Division Multi Access technology consistently used throughout the United States wireless communication industry. The use of the pager, PDA and cell phone technology in conjunction with encryption software and hardware in this application would ensure the maximum portion of the population would be notified in the event of severe weather, catastrophic event and/or terrorist attacks without the unauthorized activation of the unit. Other devices, such as vehicular dashboard displays for example, could be activated via satellite transmissions.

A passive device such as an E-FOB 38, is first activated by a NOAA broadcast of the EAS signal from a NWS tower 40 operating in the 162 MHz range. This same technology is used in standard weather radios. Once the E-FOB 38 has been activated by a signal from a NWS tower 40, the E-FOB 36 listens for a signal from the nearest cellular tower 34. If the E-FOB does not receive a cellular tower transmission within a predetermined period, the E-FOB 38 returns to an inactive state. If the E-FOB 38 receives a signal from a cellular tower 34, the E-FOB 38 provides an indication to the user of the nature of the warning.

The broadcast decision from the primary operation center 28 may be distributed to one or more redundant subordinate operation centers 42. If an EAS message fails to be broadcast by the operation center 28, the redundant subordinate operation center may release the message to the network broadcast 30.

Figure 2:
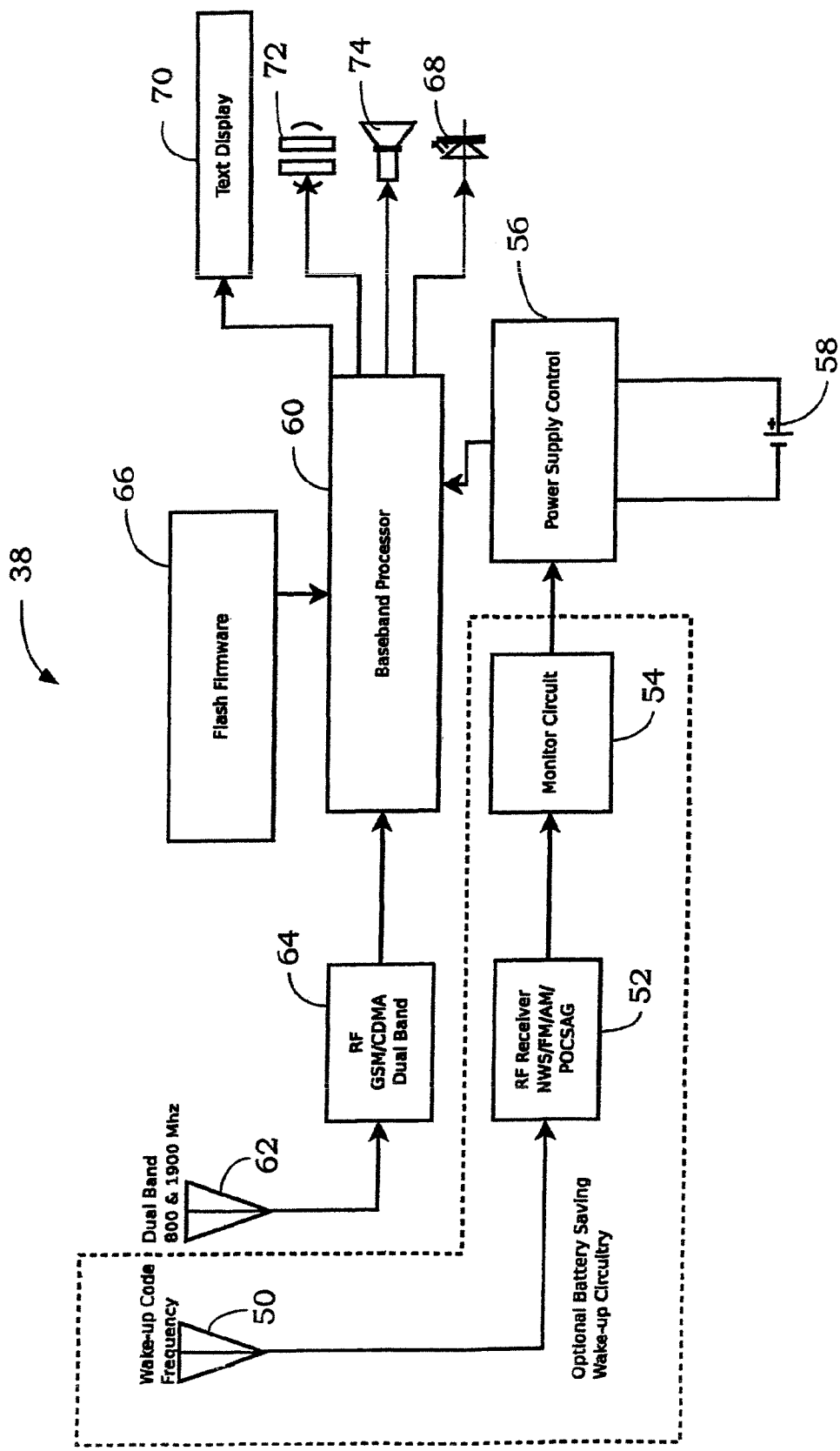
FIG. 2 is a functional block diagram of a personal alert apparatus of the present invention.

Referring to FIG. 2, a functional block diagram of a personal alert device or E-FOB is generally indicated by reference numeral 38.

A wakeup code antenna 50 is tuned to a wide area broadcast frequency such as 162 MHz NWS broadcasts, satellite broadcasts, POCSAG wide area paging, or other suitable broadcast, for example. The wakeup code antenna may be meander line antenna or other design to minimize the profile for use in a small package such as a keychain or watch. A received signal is sent to an RF NWS/FM/AM/POCSAG receiver 52 which is used to power up the E-FOB device 38.

The RF receiver 52 includes filter and preamp circuits for the wide area wakeup signal. The purpose of this receiver is to extend the battery life of the E-FOB device by only activating when a signal is received. With the system being activated only when a signal is received, the life time of the E-FOB on a single battery charge may be extended to one year for an average of 2 to 3 National Weather Service Alert signals per week.

A monitor circuit 54 monitors the output of the RF receiver 52 for the wakeup signal. A typical wakeup signal that might be used is the series of tones transmitted over National Weather Radio (MWR) just prior to the announcement of a tornado warning or watch, for example. The signal may be any standardized or proprietary code specific to the device. Upon receipt of the wakeup signal, the monitor circuit 54 generates an output to a power supply control 56 which turns on the rest of the device utilizing technology similar to the activation circuits used by weather radios currently available. The purpose of the wakeup antenna 50, RF National Weather Service receiver 52, and monitor circuit 54 are to minimize power consumption and extend the life of battery 58. This prevents the device from continually scanning the 800 and 1900 MHz frequency bands for a broadcast channel and emergency alert signal until there is an actual emergency in the area followed by a transmission over the cellular network. Battery 58 may be a lithium ion or other high capacity battery. Battery 58 may be rechargeable with provisions for a battery charging cradle or other recharger (not shown). When activated, the power supply control 56 applies power to a baseband processor 60 and other circuits in the E-Fob 38.

A dual band 800 & 1900 MHz antenna 62 is tuned to multiple bands to receive any combination of GSM, CDMA, or both signals for local area reception. This dual band antenna 62 like the wake-up antenna 50 may be designed for use in a keychain or watch. When a signal is received by the dual band antenna 62, it is sent to an RF GSM/CDMA dual band receiver 64, when activated by the power supply control 56. The RF GSM/CDMA dual band receiver 64 includes filter and preamp circuits for the GSM/CDMA cellular signal. Global System for Mobile Communication (GSM) uses Time Division Multiple Access (TDMA) with frequency hopping whereas CDMA uses Code Division Multiple Access technology. Both cellular technologies are extensively utilized by the cellular industry. This receiver 62 may be designed for GSM or CDMA or hybrid both GSM/CDMA technologies.

The baseband processor 60 decodes cellular broadcast messages from the dual band receiver 64 and activates the appropriate outputs for user, described hereinbelow. Processor instructions may be stored in a flash memory device 66 which define how broadcast messages should be processed. The process includes determination of the level of the emergency. For example, a high level warning requiring the user to take shelter and or terrorist alert may activate a red LED. Emergency alerts associated with an amber alert may activate a yellow LED. Lower level alerts such as tornado watch may activate a green LED. The layout of the three-color LEDs 68 may be the same as a stoplight configuration of red, yellow and green to allow a color blind user to readily recognize the level of the alert. A fourth LED may also be included for monthly testing of the device 38. If a wake-up code is received but there is no cellular tower for receiving a message in the immediate area, the red LED may be activated.

A text display 70 may be used to provide a text message to the user. A vibrator 72 may be activated to provide a tactile alert of the warning signal to the user. Additionally, a speaker or beeper 74 may be activated to provide an audible alert of the warning signal to the user.

In order to prevent unauthorized activation of these personal emergency alert devices 38, a method of encryption and selected firewall hardware may be incorporated. The FORTEZZA encryption technology for wireless communication developed under funding from Defense Advance Research Project Agency (DARPA) funding may used, for example. This technology was demonstrated in September of 1996 for secure information transfer in support of military operations via wireless and wired technology.

The E-Fob device is the solution for mass U.S. application. This would be a small device, similar in size and dimensions to a remote key chain. It would have a screen to allow receipt of text messages specific to the alert and would also contain four LEDs—each one a different color. This could be sold/distributed to the American populace at an extremely low price and allow anyone, regardless of socio-economic status, to protect themselves in a more timely manner.

It should be understood that while a certain form of this invention has been illustrated and described, it is not limited thereto except insofar as such limitations are included in the following claims.

Having thus described the invention, what is claimed as new and desired to be secured by Letters Patent is:

1. An electronic warning receiver comprising:
    a wakeup antenna for receiving a broadcast wakeup signal;
    a first receiver coupled to said wakeup antenna for decoding said broadcast wakeup signal;
    a monitor circuit coupled to said first receiver and responsive to said decoded wakeup signal to activate a power supply controller;
    said power supply controller for applying power to the electronic warning receiver;
    a second antenna for receiving a broadcast warning message;
    a second receiver coupled to said second antenna for decoding said broadcast warning message, and
    a microprocessor coupled to said second receiver and responsive to said decoded message to activate LEDs, a text message and/or an audible alarm indicative of the warning message received.

2. The electronic warning receiver of claim 1 wherein said broadcast wakeup signal is generated by NOAA.

3. The electronic warning receiver of claim 1 wherein said broadcast wakeup signal is generated by FEMA.

4. The electronic warning receiver of claim 1 wherein said broadcast wakeup signal is generated by a governmental agency.

5. The electronic warning receiver of claim 1 wherein said power supply controller is activated for a predetermined period of time.

6. An electronic warning receiver comprising:
    a wakeup antenna for receiving a wakeup signal;
    a first receiver coupled to said wakeup antenna for decoding said wakeup signal;
    a monitor circuit coupled to said first receiver and responsive to said decoded wakeup signal to activate a power supply controller;
    a processor responsive to activation of said power supply controller;
    a second antenna for receiving a broadcast warning message;
    a second receiver coupled to said second antenna for decoding said broadcast warning message;
    said processor coupled to said second receiver and responsive to said decoded message to activate an alarm indicative of the warning message received.

7. The electronic warning receiver of claim 6 wherein said wakeup signal is generated by the National Weather Service.

8. The electronic warning receiver of claim 6 wherein said wakeup signal is generated by NOAA.

9. The electronic warning receiver of claim 6 wherein said wakeup signal is generated by FEMA.

10. The electronic warning receiver of claim 6 wherein said wakeup signal is generated by a governmental agency.

11. The electronic warning receiver of claim 6 wherein said wakeup signal is generated by an authorized third party.

12. The electronic warning receiver of claim 6 wherein said power supply controller is activated for a predetermined period of time.

13. A method of disseminating emergency information comprising the steps of:
    receiving event transmission information by a first receiver indicative of an emergency within a geographic area;
    receiving a broadcast signal within said geographic area by a wakeup antenna;
    providing a wakeup signal in response to receiving said broadcast signal by said wakeup antenna to activate a passive receiving device within said geographic area;
    extracting an event code and location code from said event transmission information by said first receiver;
    identifying the nature of said emergency from said event code by said first receiver;
    identifying at least one transmitter within a predetermined distance of a specified location identified by said location code within a portion of said geographic area by said first receiver;
    formatting said event code corresponding to said emergency by said first receiver;
    broadcasting said event code by said at least one transmitter, receiving said event code broadcast from said at least one transmitter by said passive receiving device if said passive receiving device is within said portion of said geographic area; and
    deactivating said passive receiving device if said event code broadcast by said at least one transmitter is not received within a predetermined period of time.

14. The method as set forth in claim 13 wherein said event transmission information includes a message, wherein said extracting step includes extracting said message from said event transmission information, wherein said formatting step includes formatting said message; wherein said transmitting step includes transmitting said formatted message; wherein said broadcasting step includes broadcasting said formatted message; and wherein said receiving step includes receiving said formatted message.

15. The method as set forth in claim 14 further comprising the step of displaying said formatted message by said passive receiving device.

16. The method as set forth in claim 13 further comprising the step of activating an alarm by said passive receiving device if said event code received from said at least one transmitter is indicative of an emergency event.

17. The method as set forth in claim 16 wherein said activating an alarm step includes activating one or more LEDs.

18. The method as set forth in claim 16 wherein said activating an alarm step includes activating an audible alarm.

19. The method as set forth in claim 16 wherein said activating an alarm step includes activating a tactile alarm.

20. The method as set forth in claim 16 wherein said activating an alarm step includes activating a text message for display on said passive receiving device.

21. The method as set forth in claim 13 wherein said event transmission information includes an emergency alert system signal.

* * * * *